(12) United States Patent
Wang et al.

(10) Patent No.: US 11,450,146 B2
(45) Date of Patent: Sep. 20, 2022

(54) GESTURE RECOGNITION METHOD, APPARATUS, AND DEVICE

(71) Applicant: HUAWEI TECHNOLOGIES CO., LTD., Guangdong (CN)

(72) Inventors: Liang Wang, Shenzhen (CN); Songcen Xu, Shenzhen (CN); Chuanjian Liu, Beijing (CN); Jun He, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 351 days.

(21) Appl. No.: 16/776,282

(22) Filed: Jan. 29, 2020

(65) Prior Publication Data

US 2020/0167554 A1 May 28, 2020

Related U.S. Application Data

(63) Continuation of application No. PCT/CN2017/095388, filed on Aug. 1, 2017.

(51) Int. Cl.
  *G06K 9/00* (2022.01)
  *G06K 9/62* (2022.01)
  (Continued)

(52) U.S. Cl.
  CPC .............. *G06V 40/20* (2022.01); *G06F 3/011* (2013.01); *G06F 3/017* (2013.01); *G06K 9/629* (2013.01);
  (Continued)

(58) Field of Classification Search
  CPC ........ G06V 40/20; G06N 20/20; G06N 20/10; G06N 3/08; G06F 3/011; G06F 3/017; G06K 9/629; G06K 9/6292
  See application file for complete search history.

(56) References Cited

U.S. PATENT DOCUMENTS

2012/0056846 A1  3/2012  Zaliva
2018/0088679 A1* 3/2018  Dai ..................... G06V 40/28

FOREIGN PATENT DOCUMENTS

CN  104182772 A  12/2014
CN  102854983 B  12/2015
(Continued)

OTHER PUBLICATIONS

Molchanov et al, "Online Detection and Classification of Dynamic Hand Gestures with Recurrent 3D Convolutional Neural Networks", 2016, In Proceedings of the IEEE conference on computer vision and pattern recognition, pp. 4207-4215 (9 pages) (Year: 2016).*

(Continued)

*Primary Examiner* — David F Dunphy
(74) *Attorney, Agent, or Firm* — Fish & Richardson P.C.

(57) ABSTRACT

This application provides a gesture recognition method, and relates to the field of man-machine interaction technologies. The method includes: extracting M images from a first video segment in a video stream; performing gesture recognition on the M images by using a deep learning algorithm, to obtain a gesture recognition result corresponding to the first video segment; and performing result combination on gesture recognition results of N consecutive video segments including the first video segment, to obtain a combined gesture recognition result. In the foregoing recognition process, a gesture in the video stream does not need to be segmented or tracked, but phase actions are recognized by using a deep learning algorithm with a relatively fast calculation speed, and then the phase actions are combined, so as to improve a gesture recognition speed, and reduce a gesture recognition delay.

20 Claims, 5 Drawing Sheets

(51) Int. Cl.
  *G06F 3/01*   (2006.01)
  *G06N 3/08*   (2006.01)
  *G06N 20/20*  (2019.01)
  *G06V 40/20*  (2022.01)
  *G06N 20/10*  (2019.01)

(52) U.S. Cl.
  CPC ............ *G06K 9/6292* (2013.01); *G06N 3/08* (2013.01); *G06N 20/10* (2019.01); *G06N 20/20* (2019.01)

(56) References Cited

FOREIGN PATENT DOCUMENTS

| | | |
|---|---|---|
| CN | 106295531 A | 1/2017 |
| CN | 106991372 A | 7/2017 |
| JP | 2009205282 A | 9/2009 |
| JP | 2012088881 A | 5/2012 |
| KR | 20150088157 A | 7/2015 |

OTHER PUBLICATIONS

Office Action issued in Korean Application No. 2020-7005925 dated Jun. 22, 2021, 16 pages (with English translation).
Simonyan et al., "Two-Stream Convolutional Networks for Action Recognition in Videos," Jun. 9, 2014, XP055324674, Retrieved from the Internet: <http://papers.nips.cc/paper/5353-two-stream-convolutional-networks-for-action-recognition-in-videos.pdf>, 9 pages.
Wang et al., "Temporal Segment Networks: Towards Good Practices for Deep Action Recognition," European Conference on Computer Vision 2016 (ECCV 2016), Springer International Publishing AG 2016, Oct. 2016, 17 pages.
Partial Supplementary European Search Report issued in European Application No. 17920578.6 dated Jun. 5, 2020, 14 pages.
Yin, "Real-time continuous gesture recognition for natural multimodal interaction" Massachusetts Institute of Technology, Jun. 2014, 154 pages.
Ren et al., "Robust hand gesture recognition with Kinect sensor",Proceedings of the 19th ACM international conference on Multimedia. ACM, 2011, 2 pages.
Koller et al., "Deep Hand: How to Train a CNN on 1 Million Hand Images When Your Data Is Continuous and Weakly Labelled", 2016 IEEE Conference on Computer Vision and Pattern Recognition, 10 pages.
Molchanov et al., "Online Detection and Classification of Dynamic Hand Gestures with Recurrent 3D Convolutional Neural Networks.", 2016 IEEE Conference on Computer Vision and Pattern Recognition, 9 pages.
Wu, "Human Action Recognition Using Deep Probabilistic Graphical Models", University of Sheffield, 2014, 136 pages.
PCT International Search Report and Written Opinion in International Application No. PCT/CN2017/095,388, dated Apr. 20, 2018, 13 pages (With English Translation).
Cvsandbox.com [online], "Computer Vision Sandbox: Tutorials" available on or before Aug. 8, 2016 via Internet Archive Wayback Machine URL <https://web.archive.org/web/20160808190351/http://www.cvsandbox.com/tutorials/building_motion_detector/>, retrieved on Sep. 23, 2020, URL <http://www.cvsandbox.com/tutorials/building_motion_detector/>, 9 pages.
Extended European Search Report issued in European Application No. 17920578.6 dated Sep. 18, 2020, 14 pages.
Li et al., "An Efficient Spatiotemporal Attention Model and Its Application to Shot Matching", IEEE Transactions on Circuits and Systems for Video Technology, Institute of Electrical and Electronics Engineers, US, vol. 17, No. 10, Oct. 1, 2007, 5 pages.

* cited by examiner

GESTURE RECOGNITION METHOD, APPARATUS, AND DEVICE

CROSS-REFERENCE TO RELATED APPLICATIONS

This application is a continuation of International Application No. PCT/CN2017/095388, filed on Aug. 1, 2017, the disclosure of which is hereby incorporated by reference in its entirety.

TECHNICAL FIELD

This application relates to the field of man-machine interaction technologies, and especially, to a gesture recognition method, apparatus, and device.

BACKGROUND

Gesture input is an indispensable key technology for implementing natural and direct man-machine interaction. A gesture recognition method based on computer vision becomes a hotspot of current research because the gesture recognition method is independent of a device, has a more natural man-machine interaction effect, and has a better sense of immersion.

In a related technology, a gesture recognition solution based on computer vision is as follows: A gesture image video stream is first shot by using a camera, and the video stream is converted into an image frame; then a shape, a feature, and location information that are of a gesture are extracted from the image frame through segmentation and tracking based on a specific image tracking algorithm; and finally the gesture is recognized based on the extracted shape, feature, and location information that are of the gesture with reference to a pre-established classification rule.

In the related technology, when the shape, the feature, and the location information that are of the gesture are extracted from the image frame, the gesture in an image needs to be segmented and tracked, and a segmentation and tracking process requires a relatively long processing time. Consequently, a delay is excessively large.

SUMMARY

Embodiments of this application provide a gesture recognition method, apparatus, and device, so as to reduce a gesture recognition delay.

According to a first aspect, a gesture recognition method is provided, and the method includes: obtaining M images, where the M images are extracted from a first video segment in a video stream, the first video segment is any video segment in the video stream, and M is an integer greater than or equal to 2; performing gesture recognition on the M images by using a deep learning algorithm, to obtain a gesture recognition result corresponding to the first video segment; and after gesture recognition results of N consecutive video segments in the video stream that include the first video segment are obtained, performing result combination on the gesture recognition results of the N consecutive video segments, to obtain a combined gesture recognition result, where N≥2 and N is an integer.

In the foregoing gesture recognition method, M images in each video segment in the video stream are obtained, gesture recognition is performed on the M images by using the deep learning algorithm, to obtain a gesture recognition result corresponding to the video segment, and finally gesture recognition results of N consecutive video segments including the video segment are combined, to obtain a gesture recognition result of the N consecutive video segments. To be specific, in the foregoing recognition process, a gesture in the video stream does not need to be segmented or tracked, but phase actions are recognized by using the deep learning algorithm with a relatively fast calculation speed, and the phase actions are combined, so as to increase a gesture recognition speed, and reduce a gesture recognition delay.

In a possible implementation solution, the performing result combination on the gesture recognition results of the N consecutive video segments, to obtain a combined gesture recognition result includes:

inputting the gesture recognition results of the N consecutive video segments into a pre-trained first machine learning model, to obtain the combined gesture recognition result, where the first machine learning model is used to determine an overall gesture motion trend including the input N consecutive gesture recognition results, and to output a gesture corresponding to the overall gesture motion trend as the combined gesture recognition result.

In actual application, when performing a gesture operation, a user may perform, in a short period of time in a gesture operation process, a gesture action that does not conform to the current gesture operation. However, in the foregoing possible implementation solution, after a gesture recognition result of each video segment is recognized, a final gesture recognition result may be obtained based on a gesture motion trend indicated by gesture recognition results of a plurality of consecutive video segments, to eliminate impact exerted on the finally obtained gesture recognition result by an erroneous gesture performed by the user in the short period of time, thereby improving gesture recognition accuracy.

In a possible implementation solution, the first machine learning model is a neural network model, and the neural network model has N neurons; or the first machine learning model is a support vector machine SVM model.

In a possible implementation solution, the performing result combination on the gesture recognition results of the N consecutive video segments, to obtain a combined gesture recognition result includes:

obtaining preset weight coefficients respectively corresponding to the gesture recognition results of the N consecutive video segments; and performing weighted averaging on the gesture recognition results of the N consecutive video segments based on the weight coefficients respectively corresponding to the gesture recognition results of the N consecutive video segments, to obtain the combined gesture recognition result.

In the foregoing possible implementation solution, after a gesture recognition result of each video segment is recognized, weighted averaging may be performed on gesture recognition results of a plurality of consecutive video segments based on a preset weight, to reduce impact exerted on a finally obtained gesture recognition result by an erroneous gesture performed by a user in a short period of time, thereby improving gesture recognition accuracy.

In a possible implementation solution, the performing gesture recognition on the M images by using a deep learning algorithm, to obtain a gesture recognition result corresponding to the first video segment includes:

performing image processing on the M images, to obtain an optical flow information image corresponding to the first video segment, where the optical flow information image includes optical flow information between a first image in the M images and a $p^{th}$ image before the first image, the first image is any one of the M images, and the optical flow information includes instantaneous speed vector information of a pixel in the image, and performing gesture recognition on the optical flow information image by using a first deep learning algorithm, to obtain a first recognition result, where p is an integer greater than or equal to 1; performing image processing on the M images, to obtain a color information image corresponding to the first video segment, where the color information image includes color information of the M images, and the color information includes a color value of each pixel in the image, and performing gesture recognition on the color information image by using a second deep learning algorithm, to obtain a second recognition result; and combining the first recognition result and the second recognition result, to obtain the gesture recognition result of the first video segment.

In the foregoing possible implementation solution, the optical flow information and the color information of the video segment are extracted based on the M images, gesture recognition is performed separately based on the extracted optical flow information and color information, and then the recognized gesture recognition results are combined, to resolve a problem that a gesture recognized by using a single deep learning algorithm is inaccurate, thereby improving accuracy of the gesture recognition result of the video segment.

In a possible implementation solution, the performing image processing on the M images, to obtain an optical flow information image corresponding to the first video segment includes:

for the first image, obtaining, based on a preset rule, the $p^{th}$ image before the first image in the video stream, calculating the optical flow information between the first image and the $p^{th}$ image, and generating the optical flow information image including the optical flow information between the first image and the $p^{th}$ image, where a time interval between the first image and the $p^{th}$ image is not less than a forward calculation time of the first deep learning algorithm or a time required for calculating the optical flow information image; or for the first image, obtaining, based on a preset rule, all p images before the first image in the video stream, calculating optical flow information between every two adjacent images in the first image and the P images, and after the optical flow information between every two adjacent images is accumulated, generating an optical flow information image including the accumulated optical flow information, where a time interval between the first image and the $p^{th}$ image before the first image is not less than a forward calculation time of the first deep learning algorithm or a time required for calculating the optical flow information image.

In the foregoing possible implementation solution, an optical flow information image between a currently obtained image and a $p^{th}$ image before the current image may be obtained based on the current image and p images before the current image, so as to subsequently perform gesture recognition on the optical flow information image by using the deep learning algorithm. A gesture in the image does not need to be segmented or tracked, so that a process of processing the gesture recognition result is simplified, a gesture recognition speed is increased, and a gesture recognition delay is reduced.

In a possible implementation solution, the performing image processing on the M images, to obtain a color information image corresponding to the first video segment includes:

extracting color information of m images in the M images, generating, based on the extracted color information, color information images respectively corresponding to the m images, and obtaining the color information images respectively corresponding to the m images as the color information image corresponding to the first video segment, where the m images are m random images in the M images, or the m images are m images that are in the M images and that each have a largest variation relative to a previous image in the video stream, and m is an integer greater than or equal to 1; or detecting a pixel location in the M images at which image content changes with time, calculating an average value of color information in the M images that is corresponding to recognized pixel locations to obtain new color information at the recognized pixel locations, and generating, based on the new color information at the recognized pixel locations, the color information image corresponding to the first video segment.

In a possible implementation solution, before the obtaining M images, the method further includes:

determining a time window with a preset time length in the video stream, where an end moment of the time window is within a time period corresponding to the first video segment; determining, based on a last image and at least one reference image in the time window, whether an action is performed in the first video segment, where the at least one reference image is any image in the time window other than the last image; and if a determining result is that an action is performed in the first video segment, performing the step of obtaining the M images.

Because a gesture operation inevitably involves a gesture action, in the foregoing possible implementation solution, before gesture recognition is performed on the video segment, whether an action is performed in the video segment is first determined by using an image in the video segment and at least one image before the image, and a subsequent recognition operation is performed only when it is determined that an action is performed, so as to reduce unnecessary recognition steps, save computing resources, and improve recognition efficiency.

In a possible implementation solution, the determining, based on a last image and at least one reference image in the time window, whether an action is performed in the first video segment includes:

for each of the at least one reference image, calculating a partial derivative image of the last image, where a value of each pixel in the partial derivative image is a partial derivative of a value of a corresponding pixel in the last image relative to a value of a corresponding pixel in the reference image; normalizing the value of each pixel in the partial derivative image, to obtain a normalized partial derivative image; binarizing the normalized partial derivative image based on a preset binarization threshold, to obtain a binarized image of the partial derivative image, where a value of each pixel in the binarized image is 0 or 1; calculating a sum of grayscale values of the pixels in the binarized image; and when the sum of the grayscale values is greater than 0, determining that an action is performed in the first video segment.

In a possible implementation solution, the combining the first recognition result and the second recognition result, to obtain the gesture recognition result of the first video segment includes:

performing average value calculation on the first recognition result and the second recognition result, to obtain the gesture recognition result of the first video segment based on a calculation result of the average value calculation; or inputting the first recognition result and the second recognition result into a pre-trained second machine learning model, to obtain the gesture recognition result of the first video segment.

According to a second aspect, a gesture recognition apparatus is provided, and the apparatus has a function of implementing the gesture recognition method provided in the first aspect and the possible implementation solutions of the first aspect. The function may be implemented by using hardware, or may be implemented by executing corresponding software by hardware. The hardware or the software includes one or more units corresponding to the foregoing function.

According to a third aspect, a gesture recognition device is provided. The device includes a processor and a memory, and the processor in the device implements, by executing a program or an instruction stored in the memory, the gesture recognition method provided in the first aspect and the possible implementation solutions of the first aspect.

According to a fourth aspect, a computer readable storage medium is provided. The computer readable storage medium stores an executable program, and a processor executes the executable program to implement the gesture recognition method provided in the first aspect and the possible implementation solutions of the first aspect.

DESCRIPTION OF EMBODIMENTS

To make the objectives, technical solutions, and advantages of this application clearer, the following further describes implementations of this application in detail with reference to the accompanying drawings.

Figure 1:
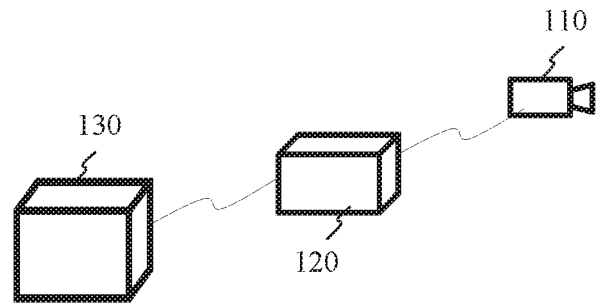
FIG. 1 is an architectural diagram of a gesture recognition system according to this application.

FIG. 1 is a system architectural diagram of a gesture recognition system according to an embodiment of this application. The gesture recognition system may include the following devices: an image capture device 110 and a gesture recognition device 120.

The image capture device 110 may be a camera. For example, the image capture device 110 may be a single camera, or the image capture device 110 may be a camera module including two or more cameras.

The image capture device 110 may be fixedly disposed, or the image capture device 110 may be integrated with a servo motor. The servo motor may drive, under control of the gesture recognition device 120, the image capture device 110 to rotate or move, to change a shooting angle or a shooting location of the image capture device 110.

The gesture recognition device 120 may be a general-purpose computer, or the gesture recognition device 120 may be an embedded computing device.

The image capture device 110 and the gesture recognition device 120 may be mutually independent devices, and the image capture device 110 and the gesture recognition device 120 are connected to each other by using a wired or wireless network.

Alternatively, the image capture device 110 and the gesture recognition device 120 may be integrated in a same physical device, and the image capture device 110 and the gesture recognition device 120 are connected to each other by using a communications bus.

Optionally, after recognizing a gesture in a video stream, the gesture recognition device 120 transmits the recognized gesture to a control device 130. The control device 130 determines a corresponding control instruction based on the recognized gesture, and performs a corresponding control operation based on the determined control instruction, for example, controls graphics display based on the control instruction, or controls, based on the control instruction, a controlled device to perform an operation.

Figure 2:
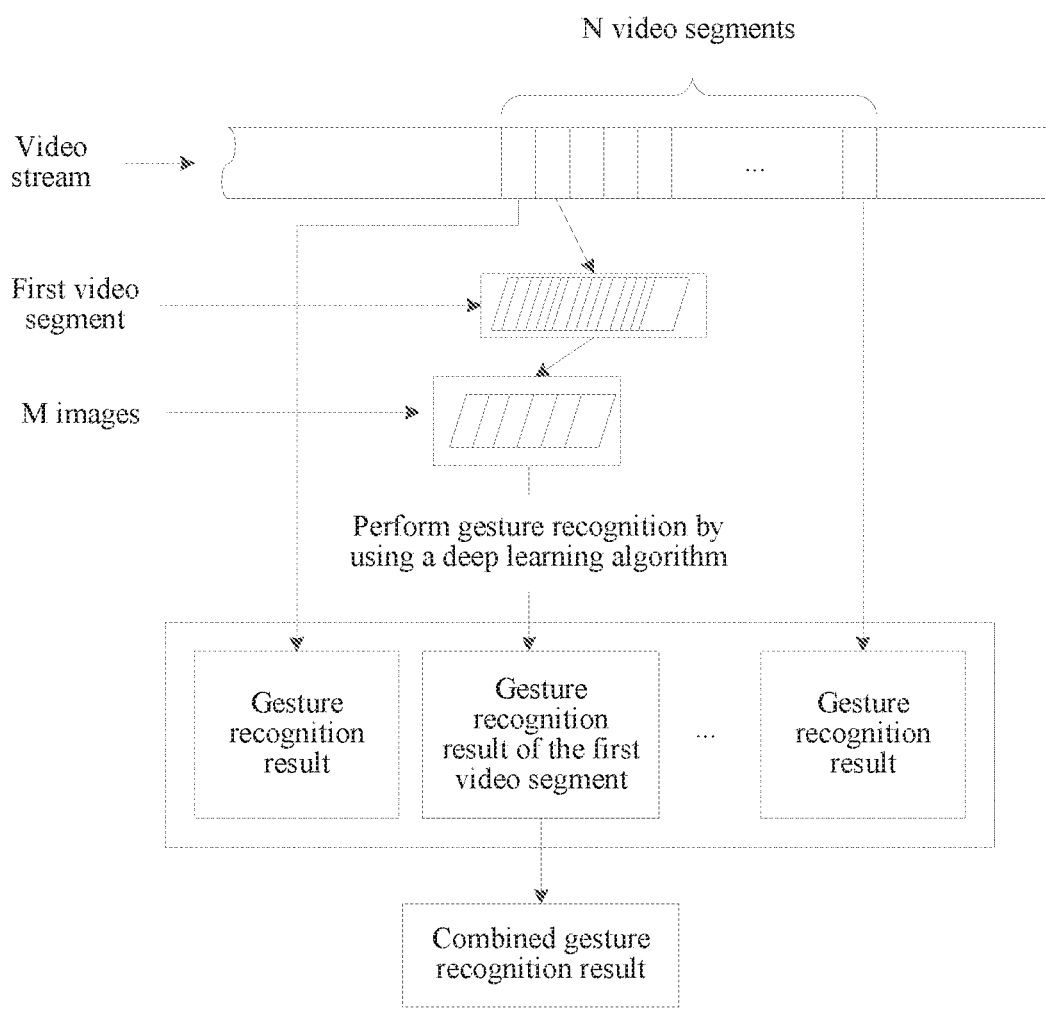
FIG. 2 is a schematic diagram of gesture recognition in the embodiment shown in FIG. 1.

In this embodiment of this application, the image capture device 110 transmits a captured video stream to the gesture recognition device 120, and the gesture recognition device 120 performs image analysis and gesture recognition on the video stream, to immediately recognize a gesture in the video stream. Referring to FIG. 2, FIG. 2 is a schematic diagram of gesture recognition according to an embodiment of this application. As shown in FIG. 2, during gesture recognition, the gesture recognition device 120 may extract M images (M is an integer greater than or equal to 2) from a video segment in a video stream. The gesture recognition device 120 performs gesture recognition on the M images by using a deep learning algorithm, to obtain a gesture recognition result corresponding to the video segment, and after obtaining gesture recognition results of N consecutive video segments in the video stream that include the video segment, performs result combination on the gesture recognition results of the N consecutive video segments, to obtain a combined gesture recognition result.

In the solution shown in this embodiment of this application, a complete gesture action is divided into a plurality of phase actions. The phase actions are recognized by using the deep learning algorithm, and finally the recognized phase actions are combined as the complete gesture action. In a recognition process, the gesture in the video stream does not need to be segmented or tracked, but the phase actions are recognized by using the deep learning algorithm with a relatively fast calculation speed, so as to increase a gesture recognition speed, and reduce a gesture recognition delay.

Figure 3:
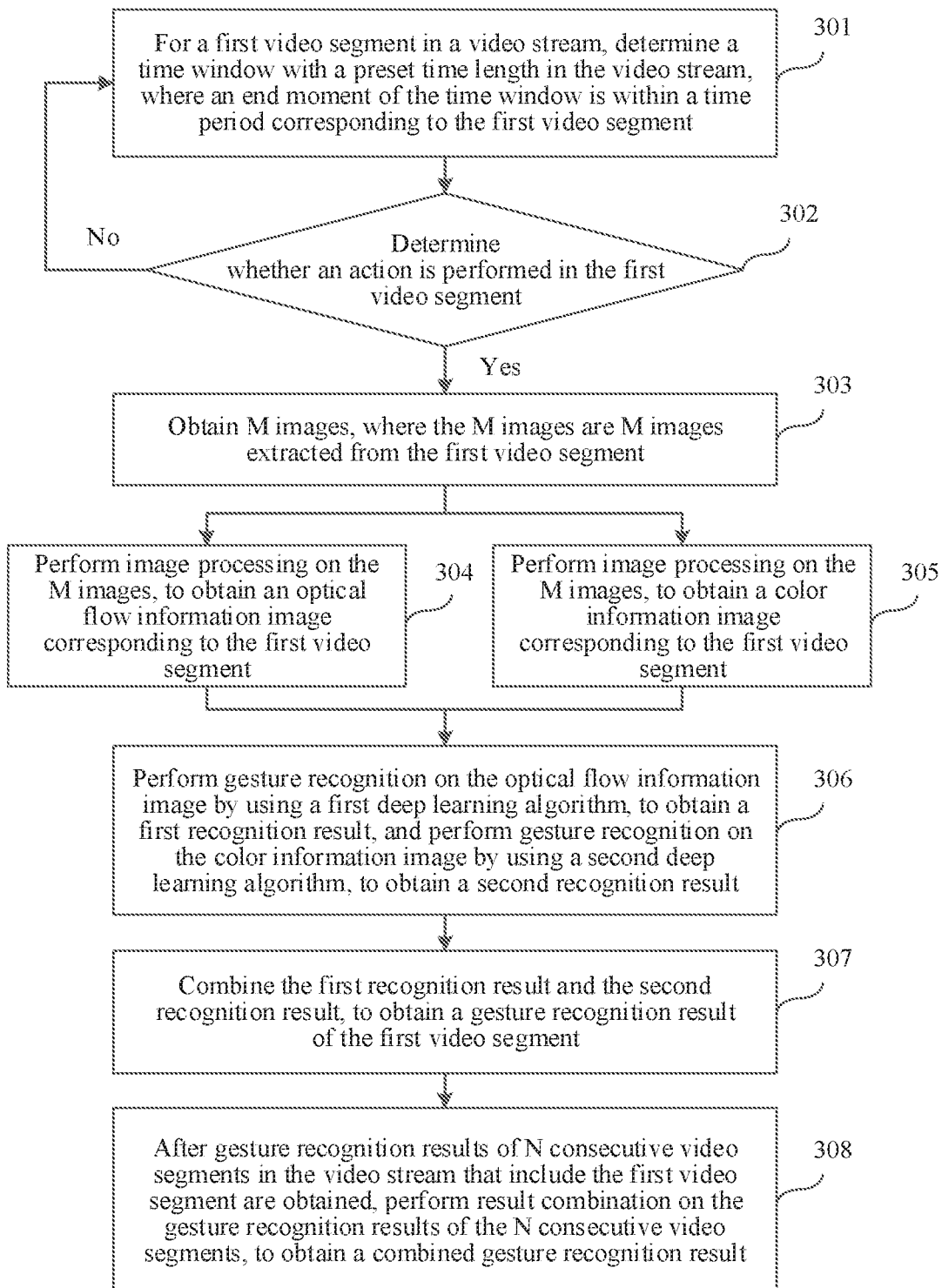
FIG. 3 is a method flowchart of a gesture recognition method according to an example embodiment of this application.

For example, the foregoing deep learning algorithm is a dual-channel deep learning algorithm based on optical flow information and color information. Referring to FIG. 3, FIG. 3 is a method flowchart of a gesture recognition method according to an example embodiment of this application. As shown in FIG. 3, the gesture recognition method may include the following steps.

Step 301: For a first video segment in a video stream, determine a time window with a preset time length in the video stream, where an end moment of the time window is within a time period corresponding to the first video segment.

The first video segment is any video segment in the video stream. In this embodiment of this application, a gesture recognition device may divide the video stream into several video segments connected in a head-to-tail manner, and perform gesture recognition for each video segment.

The video stream includes a series of video images corresponding to different time points. In this embodiment of this application, the time window may be a time window between time points corresponding to two different video images. between a time point corresponding to the first image in the time window and a time point corresponding to the last image in the time window is the preset time length.

The last image in the time window is a to-be-recognized image in the first video segment, and another image of the video stream in the time window may be an image in the first video segment, or may be an image before the first video segment in the video stream.

Figure 4:
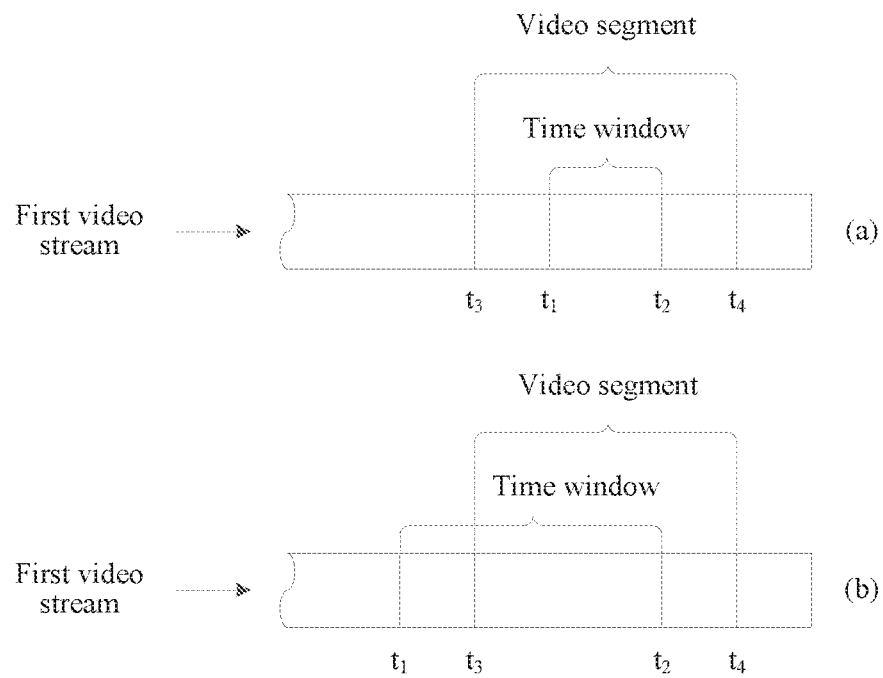
FIG. 4 is a schematic diagram of two time window spans in the embodiment shown in FIG. 3.

For example, referring to FIG. 4, FIG. 4 is a schematic diagram of two time window spans according to an embodiment of this application. In FIG. 4, a start moment of the time window is $t_1$, and an end moment of the time window is $t_2$; and a start moment of the first video segment is $t_3$, and an end moment of the first video segment is $t_4$.

As shown in FIG. 4(a), in a possible implementation, $t_1$ and $t_2$ are between $t_3$ and $t_4$. In other words, the time window is totally within the first video segment.

As shown in FIG. 4(b), in another possible implementation, $t_2$ is between $t_3$ and $t_4$, and $t_1$ is before $t_3$. In other words, a part of the time window is within the first video segment, and the other part of the time window is before the first video segment.

In addition, the foregoing preset time length may be preset by a developer on the gesture recognition device.

Step 302: Determine, based on a last image and at least one reference image in the time window, whether an action is performed in the first video segment, and if yes, perform step 303, or otherwise, return to step 301 to determine a next time window with the preset time length.

The at least one reference image is any image in the time window other than the last image.

In this embodiment of this application, the gesture recognition device determines, based on a difference between the last image of the video stream in the time window and at least one other image of the video stream in the time window, whether an action is performed in the first video segment.

In actual application, the foregoing step of the determining, based on a last image in the time window and at least one other image in the time window, whether an action is performed in the first video segment may include the following substeps.

Step 302a: For each of the at least one reference image, calculate a partial derivative image of the last image, where a value of each pixel in the partial derivative image is a partial derivative of a value of a corresponding pixel in the last image relative to a value of a corresponding pixel in the reference image.

In this embodiment of this application, an image of an input video stream may be defined as f(x, y, t), where x is a horizontal component of the image, y is a vertical component of the image, and t represents a time: t=1, 2, . . . , $t_0$ . . . . Two frames of images of the input video stream are f(x, y, $t_0$) and f(x, y, $t_0$−q). For two adjacent frames of images, q=1.

It is defined as follows: A frame of image at a moment $t_0$ is f(x, y, $t_0$), and the image at the moment $t_0$ is the last image in the time window. In this case, an image at a moment q before the moment $t_0$ is f(x, y, $t_0$−q). The gesture recognition device calculates a partial derivative of the video stream, with respect to the time t, at the moment $t_0$ relative to a moment $t_0$−q:

$$g(x, y, t_0) \triangleq \left[\frac{\partial f(x, y, t)}{\partial t}\right]_{t=t_0} \triangleq \left[\frac{f(x, y, t_0) - f(x, y, t_0 - q)}{q}\right]_{t=t_0} \quad (1)$$

Step 302b: Normalize the value of each pixel in the partial derivative image, to obtain a normalized partial derivative image.

The gesture recognition device may normalize g(x, y, $t_0$) to a range [a, b], for example, select a normalization range [a, b]=[0,1]. To be specific, the gesture recognition device normalizes a value of each pixel in g(x, y, $t_0$) to a value in the range [0,1].

Step 302c: Binarize the normalized partial derivative image based on a preset binarization threshold, to obtain a binarized image of the partial derivative image, where a value of each pixel in the binarized image is 0 or 1.

In this embodiment of this application, after the normalized partial derivative image is obtained, the normalized partial derivative image may be binarized based on a value relationship between the value of each pixel in the normalized partial derivative image and the preset binarization threshold, and the value of each pixel in the normalized partial derivative image is binarized to 0 or 1. A formula for binarizing the value of each pixel in the normalized partial derivative image is as follows:

$$g_b(x, y, t_0) = \begin{cases} 1 & \text{if } g(x, y, t_0) > Z \\ 0 & \text{if } g(x, y, t_0) \leq Z \end{cases} \quad (2)$$

In the foregoing formula 2, Z is the preset binarization threshold. For a value of a pixel in the normalized partial derivative image $g_b$(x, y, $t_0$), when the value of the pixel is greater than Z, the value of the pixel is binarized to 1, and when the value of the pixel is less than or equal to Z, the value of the pixel is binarized to 0.

The preset binarization threshold is preset, and is a value between (0, 1). For example, the preset binarization threshold may be 0.5, or the preset binarization threshold may be 0.4 or 0.6. The binarization threshold may be preset by a developer based on an actual processing effect.

Step 302d: Calculate a sum of grayscale values of the pixels in the binarized image.

Step 302e: When the sum of the grayscale values is greater than 0, determine that an action is performed in the first video segment.

In this embodiment of this application, after obtaining the binarized image $g_b$(x, y, $t_0$), the gesture recognition device calculates the sum Sum($t_0$) of the grayscale values in $g_b$(x, y, $t_0$). When the sum Sum($t_0$) is greater than 0, the gesture recognition device may determine that an action is performed in the first video segment. Otherwise, the gesture recognition device considers that "no action" is performed in the first video segment. A formula of the sum Sum($t_0$) is as follows:

$$\text{Sum}(t_0) = \Sigma_{(x,y)} g_b(x,y,t_0) \quad (3)$$

If Sum($t_0$)>0, the gesture recognition device determines that an action is performed, and performs step 303. If Sum(t₀)≤0, the gesture recognition device determines that no action is performed, and returns to step 301.

Step 303: Obtain M images, where the M images are M images extracted from the first video segment.

When determining, in step 302, that an action is performed in the first video segment, the gesture recognition device may extract the M images from the first video segment, and M is an integer greater than or equal to 2.

In actual application, the gesture recognition device may extract each image in the first video segment, to obtain the M images. Alternatively, the gesture recognition device may extract one image from the first video segment every other image or every more images, to obtain the M images.

Step 304: Perform image processing on the M images, to obtain an optical flow information image corresponding to the first video segment.

The optical flow information image includes optical flow information between a first image in the M images and a $p^{th}$ image before the first image. The first image is any one of the M images, the optical flow information includes instantaneous speed vector information of a pixel in the image, and p is an integer greater than or equal to 1.

An optical flow is an instantaneous speed of pixel motion of a spatial moving object on an observation imaging plane. The gesture recognition device may find a correspondence between a previous image and a current image by using a change of a pixel in an image sequence in time domain and a correlation between adjacent frames, to obtain motion information of an object between the two images through calculation. The motion information, obtained through calculation, of the object between the two images is optical flow information between the two images. The foregoing method for calculating the motion information of the object between the two images is referred to as an optical flow method. The optical flow information is also referred to as an optical flow field (optical flow field), and indicates an apparent motion in an image grayscale mode. The optical flow field is a two-dimensional vector field, and information included in the two-dimensional vector field is instantaneous motion speed vector information of each pixel. Therefore, the optical flow information may be represented as a dual-channel image of a same size as an original image.

When extracting the optical flow information image, the gesture recognition device may obtain one optical flow information image (regardless of a quantity of frames included in the first video segment) by using an RGB image sequence in the first video segment. In this embodiment of this application, the optical flow information image corresponding to the first video segment may be obtained in the following two manners.

Manner 1: For the first image in the M images, obtain, based on a preset rule, the $p^{th}$ image before the first image in the video stream, calculate the optical flow information between the first image and the $p^{th}$ image, and generate the optical flow information image including the optical flow information between the first image and the $p^{th}$ image.

A time interval between the first image and the $p^{th}$ image is not less than a forward calculation time of a first deep learning algorithm or a time required for calculating the optical flow information image. The first deep learning algorithm is an algorithm used by the gesture recognition device to subsequently recognize a gesture based on the optical flow information image.

The preset rule may be a rule that is independently set by a developer or a user. For example, the developer or the user may manually set a value of p. Alternatively, the gesture recognition device may independently set a value of p based on the preset rule and processing performance of the device. For example, the gesture recognition device may pre-run forward calculation of the first deep learning algorithm and calculation of the optical flow information image once, record a forward calculation time and a time used for calculating the optical flow information image, and set the value of p based on the forward calculation time, the time used for calculating the optical flow information image, and a frame rate (to be specific, a quantity of images included in a video per second) of a video stream. Specifically, for example, the gesture recognition device may determine that a larger value between the forward calculation time and the time used for calculating the optical flow information image is corresponding to a quantity of images in the video stream, and set a value corresponding to the determined quantity of images to the value of p.

For a real-time video, if T is a time interval between an image and a $p^{th}$ image before the image, a minimum value of T may be a larger value between a time required for deep learning network forward calculation used by the gesture recognition device to perform gesture recognition by using the optical flow information image and a time required by the gesture recognition device for calculating the optical flow information image.

It is assumed that OF[•] represents an optical flow algorithm. In a possible implementation, the gesture recognition device may directly obtain, through calculation, optical flow information corresponding to an image in the M images by using an Eulerian optical flow field (Eulerian motion field) algorithm based on an image $I_t(x, y)$ in M images and a $p^{th}$ image $I_{t-T}(x, y)$ before $I_t(x, y)$, generate an optical flow information image including the optical flow information obtained through calculation, and use the optical flow information image as the optical flow information image corresponding to the first video segment. A formula for calculating the optical flow information image may be simply represented as follows:

$$U_t(x,y)=OF[I_{t-T}(x,y),I_t(x,y)] \quad (4)$$

In the foregoing formula (4), $U_t(x,y)$ is an optical flow information image corresponding to the image $I_t(x, y)$, and OF[•] represents the Eulerian optical flow field algorithm.

Manner 2: For the first image in the M images, obtain, based on a preset rule, all p images before the first image in the video stream, calculate optical flow information between every two adjacent images in the first image and the p images, and after the optical flow information between every two adjacent images is accumulated, generate an optical flow information image including accumulated optical flow information.

In another possible implementation, the gesture recognition device may calculate optical flow information between every two adjacent images in an image $I_t(x, y)$ in the M images and p images $I_{t-1}(x,y), I_{t-2}(x,y), \ldots,$ and $I_{t-T}(x,y)$ before $I_t(x,y)$ by using a Lagrangian optical flow field (Lagrangian motion field) algorithm, and then accumulates the optical flow information between every two adjacent images to generate an image $U_t(x,y)$ including accumulated optical flow information. Missing data interpolation is involved in a process of accumulating the optical flow information. Interpolation manners such as linear (linear), bilinear (bilinear), and a cubic (cubic) curve may be selected. A formula for calculating the optical flow information image may be simply represented as follows:

$$U_t(x,y)=\Sigma_{k=1}^{k=T} OF[I_{t-k}(x,y),I_{t-k+1}(x,y)] \quad (5)$$

In the foregoing formula (5), $U_t(x,y)$ is an optical flow information image corresponding to the image $I_t(x,y)$, and OF[•] represents the Lagrangian optical flow field algorithm.

In the manner 1, the optical flow field needs to be calculated only once. Therefore, a relatively accurate optical flow field algorithm needs to be selected. In the manner 2, the optical flow field needs to be calculated a plurality of times. Therefore, an optical flow field algorithm with low accuracy but a fast speed is allowed to be used.

Step 305: Perform image processing on the M images, to obtain a color information image corresponding to the first video segment.

The color information image includes color information of the M images. The color information includes a color value of each pixel in the image.

The gesture recognition device processes an image sequence in the first video segment, and outputs m color information images, such as an RGB (red green blue) image, to represent the color information image corresponding to the first video segment, where m is an integer greater than or equal to 1. It is assumed that all images $I_{t-T}(x,y)$, $I_{t-T+1}(x,y), \ldots, I_{t-1}(x,y)$, and $I_t(x,y)$ in the first video segment are input, and color information of the images in the first video segment that are represented by the m images $I_t^T(x,y)$ at an end moment of the video segment is output.

When performing image processing on the M images, to obtain the color information image corresponding to the first video segment, the gesture recognition device may obtain the color information image by using the following methods.

(1) Extract color information of m images in the M images, generate, based on the extracted color information, color information images respectively corresponding to the m images, and obtain the color information images respectively corresponding to the m images as the color information image corresponding to the first video segment. For example, after extracting color information of any image in the m images, the gesture recognition device generates a color information image corresponding to the any image, and the generated color information image includes the color information of the any image.

The m images are m random images in the M images. For example, a single color information image is obtained. In this embodiment of this application, when a time length of the first video segment is relatively small, a color information image corresponding to an image that is randomly selected directly from the first video segment may be used to represent $I_t^T(x,y)$. To be specific, $$I_t^T(x,y)=I_k(x,y), t-T \leq k \leq t \quad (6)$$

where t–T is a time point corresponding to a first image in the first video segment, and t is a time point corresponding to a last image in the first video segment.

Optionally, in addition to randomly selecting the color information images of the m images as the color information image corresponding to the first video segment, the gesture recognition device may alternatively select, by using another policy, the color information images of the m images as the color information image corresponding to the first video segment. For example, the gesture recognition device may use color information images of m images at the earliest or latest corresponding time in the M images as the color information image corresponding to the first video segment.

In another possible implementation, the m images may be m images that are in the M images and that each have a largest variation relative to a previous image in the video stream.

For example, for each of the M images, the gesture recognition device may detect a pixel that is in the image and that changes relative to an image before the image in the video stream, and the gesture recognition device may obtain color information images corresponding to m images that are in the M images and that each have a largest quantity of pixels changed relative to a previous image as the color information image corresponding to the first video segment.

(2) Detect a pixel location in the M images at which image content changes with time, calculate an average value of color information in the M images that is corresponding to recognized pixel locations, to obtain new color information at the recognized pixel locations, and generate, based on the new color information at the recognized pixel locations, the color information image corresponding to the first video segment.

In this embodiment of this application, the gesture recognition device may further compare pixels at a same location in the M images to recognize the pixel location (the pixel location may be coordinates of a pixel in an image) in the M images at which image content changes with time, calculate an average value of the color information of the pixels that are in the M images and that are corresponding to the recognized pixel locations to obtain the new color information corresponding to the recognized pixel locations, and generate a new color information image. The color information corresponding to the recognized pixel locations that is in the new color information image is the new color information obtained through averaging.

The foregoing algorithm for detecting a pixel that is in an image and that changes relative to a previous image and the foregoing algorithm for detecting a pixel location that is in the image and that changes with time may be collectively referred to as a spatial-temporal salient image detection algorithm.

(3) Extract color information of all or some images in the M images, to obtain color information images respectively corresponding to the all or some images, and calculate an average value of color information of pixels in the color information images respectively corresponding to the all or some images, to obtain the color information image corresponding to the first video segment.

For example, the M images are all images in the video segment, and a single color information image is obtained. A formula for calculating an average value of color information of all images in the first video segment as the color information image of the first video segment may be as follows:

$$I_t^T(x, y) = \frac{1}{n}\sum_{k=1}^{k=T} I_k'(x, y), t - T \leq k \leq t, \quad (7)$$

where t–T is a time point corresponding to the first image in the first video segment, t is a time point corresponding to the last image in the first video segment, and n is a quantity of images in the first video segment.

(4) Extract color information of all or some images in the M images, to generate color information images respectively corresponding to the all or some images, calculate an average value of color information of pixels in the color information images respectively corresponding to the all or some images, and then use, as the color information image corresponding to the first video segment, a color information image obtained after subtracting the foregoing calculated color information of the pixels from the color information of the pixels in the color information images respectively corresponding to the all or some images.

Because a pixel in the M images that changes is usually a foreground part (to be specific, a part corresponding to a human hand), and a pixel corresponding to a background part usually remains unchanged, in the color information images respectively corresponding to the all or some images, color information of the pixel corresponding to the background part is usually the same as or similar to an average value of color information in the background part, and color information of the pixel corresponding to the foreground part is usually greatly different from an average value of color information in the foreground part. Therefore, in this embodiment of this application, color information images respectively corresponding to the all or some images other than the background part may be obtained by subtracting an average value of corresponding pixel locations from the color information of the pixels in the color information images respectively corresponding to the all or some images. The gesture recognition device may use, as the color information image corresponding to the first video segment, the color information images respectively corresponding to the all or some images other than the background part.

Step 306: Perform gesture recognition on the optical flow information image by using a first deep learning algorithm, to obtain a first recognition result, and perform gesture recognition on the color information image by using a second deep learning algorithm, to obtain a second recognition result.

In this embodiment of this application, the color information image (such as an RGB image) and the optical flow information image may be obtained in the foregoing steps based on the input video stream. Two deep learning models are respectively used for gesture recognition in step 306, and recognition results obtained by using the two deep learning models are combined in a next step.

In this embodiment of this application, a dual-channel deep learning model is used for gesture recognition. One channel is a temporal stream (corresponding to the first deep learning algorithm). The optical flow information image is input to the temporal stream, and finally a gesture recognition result of a current optical flow information image is output. For example, in step 304, after obtaining an optical flow information image of each of the M images, the gesture recognition device caches the optical flow information image. When performing gesture recognition on the optical flow information image, the gesture recognition device inputs X recently stored optical flow information images into the deep learning channel, to be specific, the temporal stream, to output gesture recognition results corresponding to the X optical flow information images, and uses the output gesture recognition results as a result of performing gesture recognition on the optical flow information image of the first video segment.

In the dual-channel deep learning model, the other channel is a spatial stream (corresponding to the second deep learning algorithm). A color information image that is obtained in step 305 and that represents at least one color information image in the first video segment is input to the spatial stream, and a gesture recognition result of the at least one color information image is output.

The dual-channel deep learning model is a pre-trained machine learning model.

Step 307: Combine the first recognition result and the second recognition result, to obtain a gesture recognition result of the first video segment.

In this embodiment of this application, because the gesture recognition result of the optical flow information image and the gesture recognition result of the color information image that are obtained in step 306 are gesture recognition results for a same video segment, after obtaining the gesture recognition result of the optical flow information image and the gesture recognition result of the color information image, the gesture recognition device may combine the two results to obtain the gesture recognition result of the first video segment.

The first recognition result and the second recognition result may be combined in the following two manners:

One manner is to perform average value calculation on the first recognition result and the second recognition result, to obtain the gesture recognition result of the first video segment based on a calculation result of the average value calculation.

The other manner is to input the first recognition result and the second recognition result into a pre-trained second machine learning model, such as a linear support vector machine (SVM) model, to obtain the gesture recognition result of the first video segment. The second machine learning model is a learning model used to determine a single recognition result based on the two input recognition results, and the second machine learning model may be obtained through training by using a video segment in which a gesture is pre-labeled. Specifically, for example, the two recognition results may be two values. The gesture recognition device may input the two values into the second machine learning model, and the second machine learning model obtains a combined value through calculation based on a pre-trained calculation formula and the two input values, and outputs the combined value as the gesture recognition result of the first video segment.

The gesture recognition device obtains, in real time, a phase gesture recognition result corresponding to each video segment, and saves the phase gesture recognition result in a temporary gesture recognition result library.

Step 308: After gesture recognition results of N consecutive video segments in the video stream that include the first video segment are obtained, perform result combination on the gesture recognition results of the N consecutive video segments, to obtain a combined gesture recognition result.

N≥2 and N is an integer.

In this embodiment of this application, when performing result combination on the gesture recognition results of the N consecutive video segments, the gesture recognition device may input the gesture recognition results of the N consecutive video segments into a pre-trained first machine learning model, to obtain the combined gesture recognition result. The first machine learning model is used to determine an overall gesture motion trend including the input N consecutive gesture recognition results, and to output a gesture corresponding to the overall gesture motion trend as the combined gesture recognition result. Specifically, for example, the N consecutive gesture recognition results may be N values. The gesture recognition device may input the N values into the first machine learning model based on a time sequence of the N video segments, and the first machine learning model obtains a combined value through calculation based on a pre-trained calculation formula and the N values that are input in sequence, and outputs the combined value as the combined gesture recognition result.

The first machine learning model is a neural network model, and the neural network model has N neurons; or the first machine learning model is a support vector machine SVM model.

Alternatively, in this embodiment of this application, when performing result combination on the gesture recognition results of the N consecutive video segments, the gesture recognition device may obtain preset weight coefficients respectively corresponding to the gesture recognition results of the N consecutive video segments, and perform weighted averaging on the gesture recognition results of the N consecutive video segments based on the weight coefficients respectively corresponding to the gesture recognition results of the N consecutive video segments, to obtain the combined gesture recognition result.

In actual application, in a process in which a user performs a single gesture operation, an overall gesture motion trend conforms to a gesture action that the user expects to perform, but a gesture of the user may not conform, in a short period of time, to the gesture action that the user expects to perform. For example, a gesture operation that the user expects to perform is to raise a hand up. The user performs the gesture operation of raising the hand up in 1 s, while the user does not raise the hand up in a quite short period of time (such as 0.2 s) within the 1 s, but slightly presses the hand down, and the user continues to raise the hand up after the quite short period of time. In this case, a gesture recognition result that is in the quite short period of time and that is recognized by the gesture recognition device does not conform to the gesture operation that the user currently expects to perform. Therefore, in this embodiment of this application, to improve gesture recognition accuracy, the gesture recognition device may combine gesture recognition results (to be specific, a sequence of gesture recognition results) of a plurality of consecutive video segments, and use, as a combined gesture recognition result, an overall gesture motion trend reflected by the gesture recognition results of the plurality of video segments.

Specifically, it is defined as follows: In a real-time consecutive video stream, the gesture recognition device calculates a phase action recognition result N times in an $N \times T_1$ time ($T_1$ is a time length of one video segment), and provides a final recognition result by using a combined decision of the N phase recognition results (after the $N \times T_1$ time). A value of $N \times T_1$ herein may be approximately 1 second based on an average time length used by the user to perform one gesture action. The N phase recognition results are combined by using a plurality of implementations, for example, the following two manners:

(1) Linear Combination:

$$\text{Result} = \alpha_1 r_1 + \alpha_2 r_2 + \ldots + \alpha_N r_N \quad (8),\text{ where}$$

$r_1, r_2, \ldots,$ and $r_N$ herein are phase recognition results, and weight coefficients before the results are $\alpha_1, \alpha_2, \ldots,$ and $\alpha_N$. These weight coefficients may be coefficients pre-determined by using a machine learning algorithm, and different combination manners are generated based on different coefficient combinations.

Figure 5:
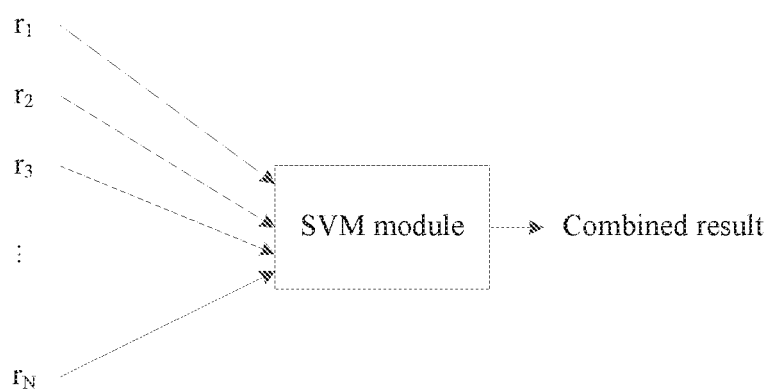
FIG. 5 is a schematic diagram of recognition result combination in the embodiment shown in FIG. 3.

(2) Support Vector Machine SVM Method:

Referring to FIG. 5, FIG. 5 is a schematic diagram of recognition result combination according to an embodiment of this application. As shown in FIG. 5, in this embodiment of this application, phase recognition results $r_1, r_2, \ldots,$ and $r_N$ may be input into a pre-trained machine learning model, to be specific, an SVM module (an SVM kernel function in the SVM module is a preset or pre-trained kernel function) shown in FIG. 5, to output a combined result.

After obtaining the combined gesture recognition result, the gesture recognition device may invoke a corresponding module (such as slide presentation or full-screen picture play) based on the gesture recognition result, to implement man-machine interaction.

In this embodiment of this application, if the gesture recognition device determines that no action is performed in a video segment, the gesture recognition device may not perform gesture recognition on the video segment, to reduce gesture recognition frequency, and avoid an unnecessary recognition process. Specifically, the gesture recognition device may directly set a gesture recognition result of the video segment to null, or may not set a gesture recognition result of the video segment.

Figure 6:
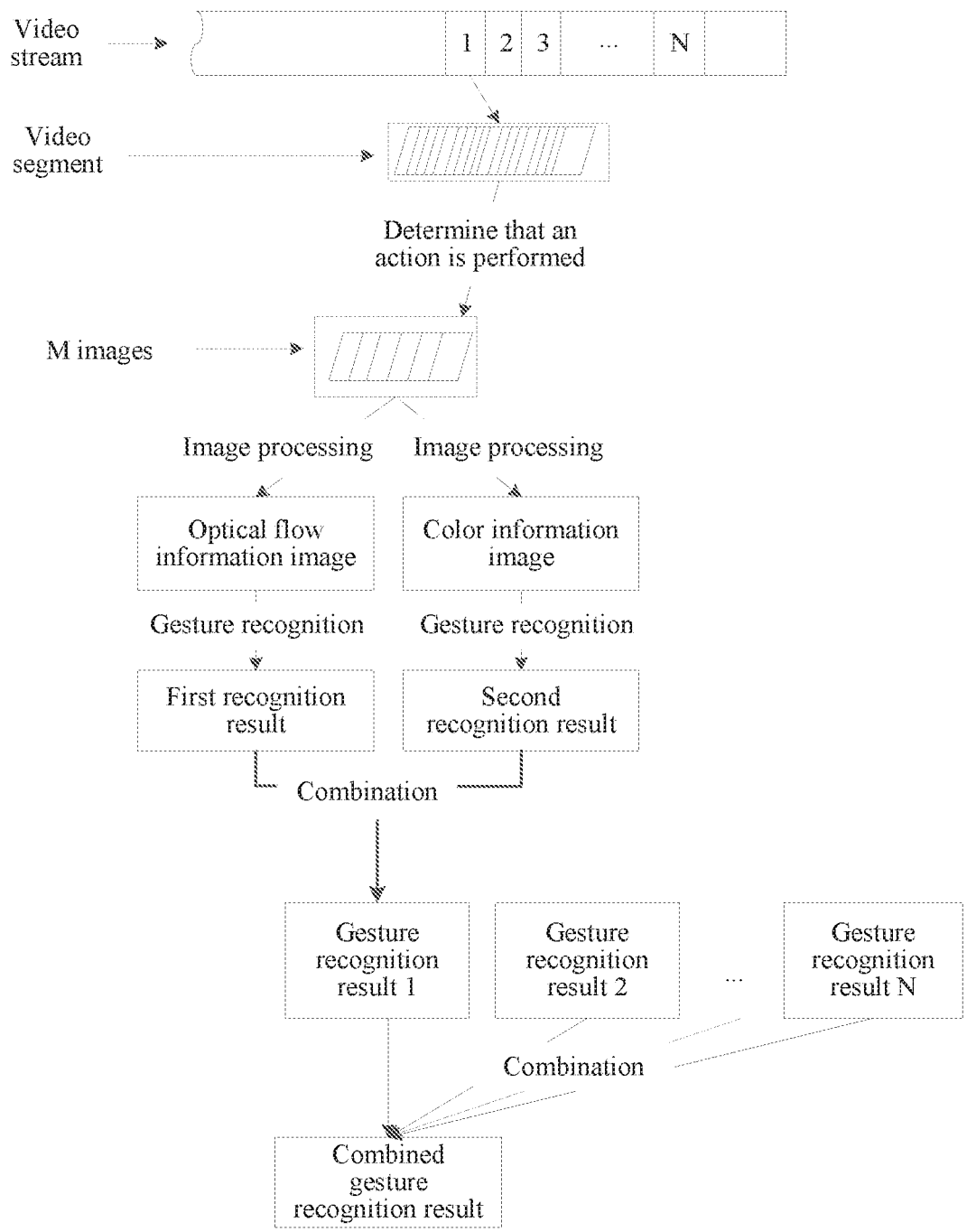
FIG. 6 is a schematic flowchart of gesture recognition in the embodiment shown in FIG. 3.

Referring to FIG. 6, FIG. 6 is a schematic flowchart of gesture recognition according to an embodiment of this application. For example, this procedure is used for the gesture recognition system shown in FIG. 1. As shown in FIG. 6, an image capture device inputs a captured video stream into a gesture recognition device. After extracting an image in the video stream, the gesture recognition device determines, by using the method shown in step 302 and based on the image and at least one image before the image in a period of time, whether an action is performed in the image relative to the at least one image before the image. If determining that an action is performed, for images in a video segment in which the current image in the video stream is located (or for some of the images), the gesture recognition device respectively extracts an optical flow information image and a color information image of the video segment by using the methods in step 304 and step 305, respectively performs gesture recognition on the optical flow information image and the color information image by using the method shown in step 306, and then combines, by using the method shown in step 307, gesture recognition results obtained by respectively performing gesture recognition on the optical flow information image and the color information image, to obtain a phase gesture recognition result corresponding to the video segment. After consecutively obtaining N phase gesture recognition results, the gesture recognition device combines the N gesture recognition results by using the method shown in step 308, to obtain a combined gesture recognition result.

Optionally, the above-mentioned machine learning models (including the first machine learning model, the second machine learning model, the dual-channel deep learning model in step 306, and the like) may be obtained through machine training by using a video stream sample in which a corresponding gesture is pre-labeled.

The foregoing machine training process may be implemented by a model training device. Specifically, for example, the first machine learning model, the second machine learning model, and the dual-channel deep learning model are obtained through machine training. In a possible implementation, a developer may input several video stream samples into the model training device, where each video stream sample includes a gesture, and the developer pre-labels the gesture in each video stream sample. In addition, the developer divides each video stream into a plurality of video segments, and labels a phase gesture corresponding to each video segment. During machine training, the model training device extracts an optical flow information image and a color information image of each video segment by using the solutions shown in step 304 and step 305, inputs the optical flow information image and the color information image of the video segment into the dual-channel deep learning model, and inputs, into the second machine learning model, two recognition results output by the dual-channel deep learning model and a phase gesture labeled in the video segment, to perform model training on the dual-channel deep learning model and the second machine learning model. In addition, for each video stream sample, the model training device inputs a phase gesture of each video segment in the video stream sample and a pre-labeled gesture in the video stream sample into the first machine learning model for machine training, to obtain the first machine learning model.

For another example, the first machine learning model, the second machine learning model, and the dual-channel deep learning model are obtained through machine training. In another possible implementation, a developer may input several video stream samples into a model training device, where each video stream sample includes a gesture, and the developer pre-labels the gesture in each video stream sample. The model training device divides a video stream into a plurality of video segments, extracts an optical flow information image and a color information image of each video segment, inputs the optical flow information image and the color information image of the video segment into the dual-channel deep learning model, inputs, into the second machine learning model, two recognition results output by the dual-channel deep learning model, and then inputs, into the first machine learning model, phase gesture recognition results that are of the plurality of video segments and that are output by the second machine learning model. In addition, the model training device inputs a labeled gesture corresponding to the video stream into the first machine learning model, to simultaneously perform machine training on the first machine learning model, the second machine learning model, and the dual-channel deep learning model.

It should be noted that the method shown in this embodiment of the present invention is described by using the dual-channel deep learning model as an example. In actual application, when recognizing each video segment, the gesture recognition device may recognize a gesture in a single video segment by using another deep learning algorithm. For example, the gesture recognition device may recognize, only by using the optical flow information image, a gesture recognition result corresponding to the video segment, or the gesture recognition device may recognize, only by using the color information image, a gesture recognition result corresponding to the video segment. The foregoing deep learning algorithm for recognizing the gesture recognition result of the video segment is not limited in this embodiment of the present invention.

In conclusion, according to the method shown in this embodiment of this application, the gesture recognition device respectively extracts an optical flow information image and a color information image of each video segment in a video stream, and respectively performs gesture recognition on the optical flow information image and the color information image by using a deep learning algorithm. After gesture recognition, the gesture recognition device combines gesture recognition results corresponding to the two images, to determine a gesture recognition result corresponding to the video segment, and finally combines gesture recognition results of N consecutive video segments including the video segment, to obtain a gesture recognition result of the N consecutive video segments. To be specific, in the foregoing method, the gesture recognition device divides a complete gesture action into a plurality of phase actions, recognizes the phase actions by using the deep learning algorithm, and finally combines the recognized phase actions as the complete gesture action. In a recognition process, a gesture in the video stream does not need to be segmented or tracked, but the phase actions are recognized by using the deep learning algorithm with a relatively fast calculation speed, so as to increase a gesture recognition speed, and reduce a gesture recognition delay.

Figure 7:
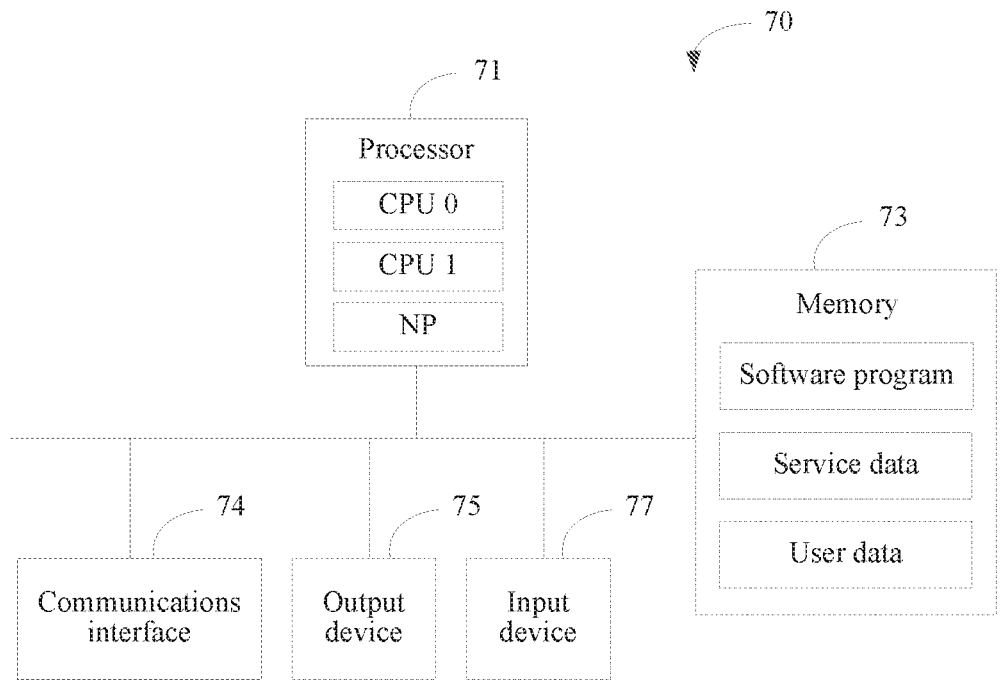
FIG. 7 is a schematic structural diagram of a gesture recognition device according to an example of an embodiment of this application.

FIG. 7 is a schematic structural diagram of a gesture recognition device 70 according to an example of an embodiment of this application. The gesture recognition device 70 may be implemented as the gesture recognition device 120 in the system shown in FIG. 1. As shown in FIG. 7, the gesture recognition device 70 may include a processor 71 and a memory 73.

The processor 71 may include one or more processing units, and the processing unit may be a central processing unit (CPU), a network processor (NP), or the like.

Optionally, the gesture recognition device 70 may further include the memory 73. The memory 73 may be configured to store a software program, and the software program may be executed by the processor 71. In addition, the memory 73 may further store various types of service data or user data. The software program may include an image obtaining module, a recognition module, and a combination module. Optionally, the software program may further include a time window determining module and a judgment module.

The image obtaining module is executed by the processor 71, to implement the function of obtaining M images extracted from a first video segment in a video stream in the embodiment shown in FIG. 3.

The recognition module is executed by the processor 71, to implement the function of recognizing a gesture recognition result corresponding to the first video segment in the embodiment shown in FIG. 3.

The combination module is executed by the processor 71, to implement the function of combining gesture recognition results of N consecutive video segments in the embodiment shown in FIG. 3.

The time window determining module is executed by the processor 71, to implement the function of determining a time window in the embodiment shown in FIG. 3.

The judgment module is executed by the processor 71, to implement the function of determining whether an action is performed in the first video segment in the embodiment shown in FIG. 3.

Optionally, the gesture recognition device 70 may further include a communications interface 74, and the communications interface 74 may include a network interface. The network interface is configured to connect to an image capture device. Specifically, the network interface may include a wired network interface, such as an Ethernet interface or a fiber interface, or the network interface may include a wireless network interface, such as a wireless local area network interface or a cellular mobile network interface. The gesture recognition device 70 communicates with another device by using the communications interface 74.

Optionally, the processor 71 may be connected to the memory 73 and the communications interface 74 by using a bus.

Optionally, the gesture recognition device 70 may further include an output device 75 and an input device 77. The output device 75 and the input device 77 are connected to the processor 71. The output device 75 may be a display configured to display information, a power amplification device that plays sound, a printer, or the like. The output device 75 may further include an output controller, to provide output for the display, the power amplification device, or the printer. The input device 77 may be a device such as a mouse, a keyboard, an electronic stylus, or a touch panel used by a user to input information. The input device 77 may further include an input controller, to receive and process input from the device such as the mouse, the keyboard, the electronic stylus, or the touch panel.

The following is an apparatus embodiment of this application, and the apparatus embodiment may be used to execute the method embodiment of this application. For details not disclosed in the apparatus embodiment of this application, refer to the method embodiment of this application.

Figure 8:
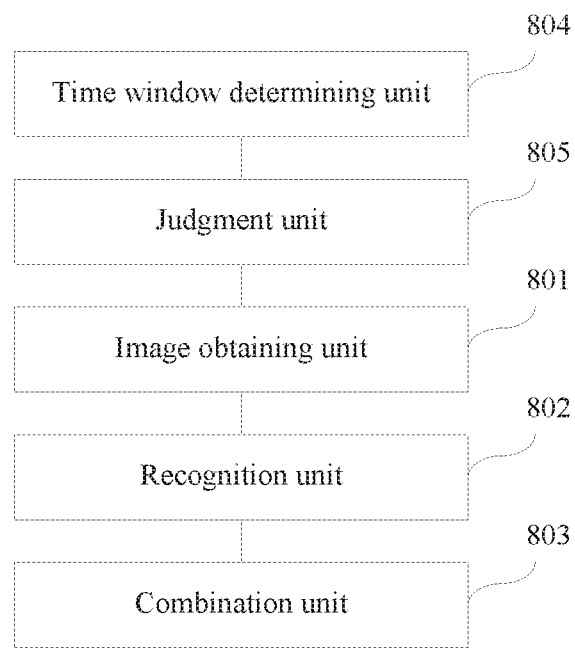
FIG. 8 is a structural block diagram of a gesture recognition apparatus according to an example of an embodiment of this application.

FIG. 8 is a structural block diagram of a gesture recognition apparatus according to an example of an embodiment of this application. The gesture recognition apparatus may be implemented as a part or all of a gesture recognition device by using a hardware circuit or a combination of software and hardware. The gesture recognition device may be the gesture recognition device 120 in the embodiment shown in FIG. 1. The gesture recognition apparatus may include an image obtaining unit 801, a recognition unit 802, and a combination unit 803. Optionally, the gesture recognition apparatus may further include a time window determining unit 804 and a judgment unit 805.

The image obtaining unit 801 is executed by a processor, to implement the function of obtaining M images extracted from a first video segment in a video stream in the embodiment shown in FIG. 3.

The recognition unit 802 is executed by the processor, to implement the function of obtaining a gesture recognition result corresponding to the first video segment in the embodiment shown in FIG. 3.

The combination unit 803 is executed by the processor, to implement the function of combining gesture recognition results of N consecutive video segments in the embodiment shown in FIG. 3.

The time window determining unit 804 is executed by the processor, to implement the function of determining a time window in the embodiment shown in FIG. 3.

The judgment unit 805 is executed by the processor, to implement the function of determining whether an action is performed in the first video segment in the embodiment shown in FIG. 3.

It should be noted that, when the gesture recognition apparatus provided in the foregoing embodiment performs gesture recognition, division of the foregoing function units is merely used as an example for description. In actual application, the foregoing functions may be allocated to different function units for implementation as required. To be specific, an internal structure of the device is divided into different function units to implement all or some of the functions described above. In addition, the gesture recognition apparatus provided in the foregoing embodiment pertains to a same concept as the method embodiment of the gesture recognition method. For a specific implementation process, refer to the method embodiment, and details are not described herein again.

The sequence numbers of the foregoing embodiments of this application are merely for illustrative purposes, and do not indicate priorities of the embodiments.

A person of ordinary skill in the art may understand that all or some of the steps of the embodiments may be implemented by hardware or program instructing related hardware. The program may be stored in a computer-readable storage medium. The storage medium may include a read-only memory, a magnetic disk, or an optical disc.

The foregoing descriptions are merely optional embodiments of this application, but are not intended to limit this application. Any modification, equivalent replacement, or improvement made without departing from the principle of this application should fall within the protection scope of this application.

What is claimed is:

1. A gesture recognition device, comprising:
at least one processor;
one or more memories coupled to the at least one processor and storing programming instructions for execution by the at least one processor to:
obtain M images, wherein the M images are extracted from a first video segment in a video stream, the first video segment is a video segment in the video stream, and M is an integer greater than or equal to 2;
perform gesture recognition on the M images by using a deep learning algorithm to obtain a gesture recognition result corresponding to the first video segment; and
after obtaining gesture recognition results of N consecutive video segments in the video stream that comprise the first video segment, combine the gesture recognition results of the N consecutive video segments to obtain a combined gesture recognition result, wherein N is an integer greater than or equal to 2, wherein combining the gesture recognition results of the N consecutive video segments to obtain the combined gesture recognition result comprises performing weighted averaging on the gesture recognition results of the N consecutive video segments based on weight coefficients respectively corresponding to the gesture recognition results of the N consecutive video segments to obtain the combined gesture recognition result.

2. The device according to claim 1, wherein the programming instructions are for execution by the at least one processor to:
input the gesture recognition results of the N consecutive video segments into a pre-trained first machine learning model to obtain the combined gesture recognition result, wherein the pre-trained first machine learning model is used to determine an overall gesture motion trend indicated by the gesture recognition results of the N consecutive video segments, and to output a gesture corresponding to the overall gesture motion trend as the combined gesture recognition result.

3. The device according to claim 2, wherein:
the pre-trained first machine learning model is a neural network model, and the neural network model has N neurons; or
the pre-trained first machine learning model is a support vector machine (SVM) model.

4. The device according to claim 1, wherein the weight coefficients are preset weight coefficients, and wherein the programming instructions are for execution by the at least one processor to:
obtain the preset weight coefficients respectively corresponding to the gesture recognition results of the N consecutive video segments.

5. The device according to claim 1, wherein the programming instructions are for execution by the at least one processor to:
perform image processing on the M images to obtain an optical flow information image corresponding to the first video segment, wherein the optical flow information image comprises optical flow information between a first image in the M images and a $p^{th}$ image before the first image, the first image is one of the M images, and the optical flow information comprises instantaneous speed vector information of a pixel in the image;

perform gesture recognition on the optical flow information image by using a first deep learning algorithm to obtain a first recognition result, wherein p is an integer greater than or equal to 1;

perform image processing on the M images to obtain a color information image corresponding to the first video segment, wherein the color information image comprises color information of the M images, and the color information comprises a color value of each pixel in the image;

perform gesture recognition on the color information image by using a second deep learning algorithm to obtain a second recognition result; and combine the first recognition result and the second recognition result to obtain the gesture recognition result of the first video segment.

6. The device according to claim 5, wherein the programming instructions are for execution by the at least one processor to:

for the first image, obtain, based on a preset rule, the $p^{th}$ image before the first image in the video stream, calculate the optical flow information between the first image and the $p^{th}$ image, and generate the optical flow information image comprising the optical flow information between the first image and the $p^{th}$ image, wherein a time interval between the first image and the $p^{th}$ image is not less than a forward calculation time of the first deep learning algorithm or a time required for calculating the optical flow information image; or for the first image, obtain, based on a preset rule, p images before the first image in the video stream, calculate optical flow information between every two adjacent images in the first image and the P images, and after accumulating the optical flow information between every two adjacent images, generate an optical flow information image comprising accumulated optical flow information, wherein a time interval between the first image and the $p^{th}$ image before the first image is not less than a forward calculation time of the first deep learning algorithm or a time required for calculating the optical flow information image.

7. The device according to claim 5, wherein the programming instructions are for execution by the at least one processor to:

extract color information of m images in the NI images, generate, based on the extracted color information, color information images respectively corresponding to the m images, and obtain the color information images respectively corresponding to the m images as the color information image corresponding to the first video segment, wherein the m images are m random images in the M images, or the m images are m images that are in the M images and that each have a largest variation relative to a previous image in the video stream, and m is an integer greater than or equal to 1; or detect a pixel location in the M images at which image content changes with time, calculate an average value of color information in the M images that is corresponding to recognized pixel locations to obtain new color information at the recognized pixel locations, and generate, based on the new color information at the recognized pixel locations, the color information image corresponding to the first video segment.

8. The device according to claim 5, wherein the programming instructions are for execution by the at least one processor to:

perform average value calculation on the first recognition result and the second recognition result to obtain the gesture recognition result of the first video segment based on a calculation result of the average value calculation; or input the first recognition result and the second recognition result into a pre-trained second machine learning model to obtain the gesture recognition result of the first video segment.

9. The device according to claim 1, wherein before obtaining the M images, the programming instructions are for execution by the at least one processor to:

determine a time window with a preset time length in the video stream, wherein an end moment of the time window is within a time period corresponding to the first video segment;

determine, based on a last image and at least one reference image in the time window, whether an action is performed in the first video segment, wherein the reference image is an image in the time window other than the last image; and in response to determining that an action is performed in the first video segment, obtain the M images.

10. The device according to claim 9, wherein the programming instructions are for execution by the at least one processor to:

for each of the at least one reference image, calculate a partial derivative image of the last image, wherein a value of each pixel in the partial derivative image is a partial derivative of a value of a corresponding pixel in the last image relative to a value of a corresponding pixel in the reference image;

normalize the value of each pixel in the partial derivative image to obtain a normalized partial derivative image;

binarize the normalized partial derivative image based on a preset binarization threshold to obtain a binarized image of the partial derivative image, wherein a value of each pixel in the binarized image is 0 or 1;

calculate a sum of grayscale values of the pixels in the binarized image; and when the sum of the grayscale values is greater than 0, determine that an action is performed in the first video segment.

11. A gesture recognition method, wherein the method comprises:

obtaining M images, wherein the M images are extracted from a first video segment in a video stream, the first video segment is a video segment in the video stream, and NI is an integer greater than or equal to 2;

performing gesture recognition on the M images by using a deep learning algorithm to obtain a gesture recognition result corresponding to the first video segment; and after obtaining gesture recognition results of N consecutive video segments in the video stream that comprise the first video segment, combining the gesture recognition results of the N consecutive video segments to obtain a combined gesture recognition result, wherein N≥2 and N is an integer, wherein combining the gesture recognition results of the N consecutive video segments to obtain the combined gesture recognition result comprises performing weighted averaging on the gesture recognition results of the N consecutive video segments based on weight coefficients respectively corresponding to the gesture recognition results of the N consecutive video segments to obtain the combined gesture recognition result.

12. The method according to claim 11, wherein the combining the gesture recognition results of the N consecutive video segments to obtain a combined gesture recognition result comprises:
inputting the gesture recognition results of the N consecutive video segments into a pre-trained first machine learning model to obtain the combined gesture recognition result, wherein the pre-trained first machine learning model is used to determine an overall gesture motion trend indicated by the gesture recognition results of the N consecutive video segments, and to output a gesture corresponding to the overall gesture motion trend as the combined gesture recognition result.

13. The method according to claim 12, wherein:
the pre-trained first machine learning model is a neural network model, and the neural network model has N neurons; or
the pre-trained first machine learning model is a support vector machine (SVM) model.

14. The method according to claim 11, wherein the weight coefficients are preset weight coefficients, and wherein the combining the gesture recognition results of the N consecutive video segments to obtain a combined gesture recognition result comprises:
obtaining the preset weight coefficients respectively corresponding to the gesture recognition results of the N consecutive video segments.

15. The method according to claim 11, wherein the performing gesture recognition on the M images by using a deep learning algorithm to obtain a gesture recognition result corresponding to the first video segment comprises:
performing image processing on the M images to obtain an optical flow information image corresponding to the first video segment, wherein the optical flow information image comprises optical flow information between a first image in the M images and a $p^{th}$ image before the first image, the first image is one of the M images, and the optical flow information comprises instantaneous speed vector information of a pixel in the image;
performing gesture recognition on the optical flow information image by using a first deep learning algorithm to obtain a first recognition result, wherein p is an integer greater than or equal to 1;
performing image processing on the M images to obtain a color information image corresponding to the first video segment, wherein the color information image comprises color information of the M images, and the color information comprises a color value of each pixel in the image;
performing gesture recognition on the color information image by using a second deep learning algorithm to obtain a second recognition result; and
combining the first recognition result and the second recognition result to obtain the gesture recognition result of the first video segment.

16. The method according to claim 15, wherein the performing image processing on the M images to obtain an optical flow information image corresponding to the first video segment comprises:
for the first image, obtaining, based on a preset rule, the $p^{th}$ image before the first image in the video stream, calculating the optical flow information between the first image and the $p^{th}$ image, and generating the optical flow information image comprising the optical flow information between the first image and the $p^{th}$ image, wherein a time interval between the first image and the $p^{th}$ image is not less than a forward calculation time of the first deep learning algorithm or a time required for calculating the optical flow information image; or
for the first image, obtaining, based on a preset rule, p images before the first image in the video stream, calculating optical flow information between every two adjacent images in the first image and the P images, and after the optical flow information between every two adjacent images is accumulated, generating an optical flow information image comprising the accumulated optical flow information, wherein a time interval between the first image and the $p^{th}$ image before the first image is not less than a forward calculation time of the first deep learning algorithm or a time required for calculating the optical flow information image.

17. The method according to claim 15, wherein the performing image processing on the M images to obtain a color information image corresponding to the first video segment comprises:
extracting color information of m images in the M images, generating, based on the extracted color information, color information images respectively corresponding to the m images, and obtaining the color information images respectively corresponding to the m images as the color information image corresponding to the first video segment, wherein the m images are m random images in the M images, or the m images are m images that are in the M images and that each have a largest variation relative to a previous image in the video stream, and m is an integer greater than or equal to 1; or
detecting a pixel location in the M images at which image content changes with time, calculating an average value of color information in the M images that is corresponding to recognized pixel locations to obtain new color information at the recognized pixel locations, and generating, based on the new color information at the recognized pixel locations, the color information image corresponding to the first video segment.

18. The method according to claim 15, wherein the combining the first recognition result and the second recognition result to obtain the gesture recognition result of the first video segment comprises:
performing average value calculation on the first recognition result and the second recognition result to obtain the gesture recognition result of the first video segment based on a calculation result of the average value calculation; or
inputting the first recognition result and the second recognition result into a pre-trained second machine learning model to obtain the gesture recognition result of the first video segment.

19. The method according to claim 11, wherein before the obtaining M images, the method further comprises:
determining a time window with a preset time length in the video stream, wherein an end moment of the time window is within a time period corresponding to the first video segment;
determining, based on a last image and at least one reference image in the time window, whether an action is performed in the first video segment, wherein the at least one reference image is an image in the time window other than the last image; and
in response to determining that an action is performed in the first video segment, obtaining the M images.

20. The method according to claim 19, wherein the determining, based on a last image and at least one reference image in the time window; whether an action is performed in the first video segment comprises:
- for each of the at least one reference image, calculating a partial derivative image of the last image, wherein a value of each pixel in the partial derivative image is a partial derivative of a value of a corresponding pixel in the last image relative to a value of a corresponding pixel in the reference image;
- normalizing the value of each pixel in the partial derivative image to obtain a normalized partial derivative image;
- binarizing the normalized partial derivative image based on a preset binarization threshold to obtain a binarized image of the partial derivative image, wherein a value of each pixel in the binarized image is 0 or 1;
- calculating a sum of grayscale values of the pixels in the binarized image; and
- when the sum of the grayscale values is greater than 0, determining that an action is performed in the first video segment.

* * * * *

UNITED STATES PATENT AND TRADEMARK OFFICE
CERTIFICATE OF CORRECTION

PATENT NO. : 11,450,146 B2
APPLICATION NO. : 16/776282
DATED : September 20, 2022
INVENTOR(S) : Liang Wang et al.

Page 1 of 1

It is certified that error appears in the above-identified patent and that said Letters Patent is hereby corrected as shown below:

In the Claims

In Column 21, In Line 46, In Claim 7, delete "NI" and insert -- M --.

In Column 22, In Line 50, In Claim 11, delete "NI" and insert -- M --.

In Column 24, In Line 23, In Claim 17, delete "in" and insert -- m --.

In Column 25, In Line 1, In Claim 20, delete "window;" and insert -- window, --.

Signed and Sealed this
Twenty-fifth Day of April, 2023

Katherine Kelly Vidal
*Director of the United States Patent and Trademark Office*